United States Patent
Gold et al.

(10) Patent No.: US 6,648,269 B2
(45) Date of Patent: Nov. 18, 2003

(54) TRIM AUGMENTATION SYSTEM FOR A ROTARY WING AIRCRAFT

(75) Inventors: Phillip Jeremy Gold, Shelton, CT (US); James B. Dryfoos, Wallingford, PA (US); Roy Brewer, Drexel Hill, PA (US)

(73) Assignee: Sikorsky Aircraft Corporation, Stratford, CT (US)

( * ) Notice: Subject to any disclaimer, the term of this patent is extended or adjusted under 35 U.S.C. 154(b) by 0 days.

(21) Appl. No.: 10/016,520

(22) Filed: Dec. 10, 2001

(65) Prior Publication Data

US 2003/0106958 A1 Jun. 12, 2003

(51) Int. Cl.⁷ .............................................. B64C 27/57
(52) U.S. Cl. ........................................ 244/17.13; 701/3
(58) Field of Search ............................ 244/17.11, 17.13, 244/17.25, 177, 181, 182, 194, 195; 701/3–16

(56) References Cited

U.S. PATENT DOCUMENTS

| | | | |
|---|---|---|---|
| 4,200,252 A | 4/1980 | Logan et al. | |
| 4,213,584 A | * 7/1980 | Tefft et al. | 244/17.13 |
| 4,626,998 A | 12/1986 | Adams et al. | |
| 5,001,646 A | * 3/1991 | Caldwell et al. | 244/17.13 |
| 5,023,796 A | 6/1991 | Kahler | |
| 5,167,167 A | 12/1992 | Tiernan, Jr. et al. | |
| 5,169,090 A | 12/1992 | Wright et al. | |
| 5,178,307 A | 1/1993 | Wright et al. | |
| 5,195,039 A | 3/1993 | Gold et al. | |
| 5,195,700 A | 3/1993 | Fogler, Jr. et al. | |
| 5,213,282 A | 5/1993 | Gold et al. | |
| 5,213,283 A | 5/1993 | Gold et al. | |
| 5,222,691 A | 6/1993 | Gold et al. | |
| 5,238,203 A | 8/1993 | Skonieczny et al. | |
| 5,301,112 A | 4/1994 | Gold et al. | |
| 5,310,135 A | * 5/1994 | Fowler et al. | 244/17.13 |
| 5,331,881 A | * 7/1994 | Fowler et al. | 244/17.13 |
| 5,428,543 A | 6/1995 | Gold et al. | |
| 5,465,212 A | * 11/1995 | Fowler et al. | 244/178 |
| 5,553,817 A | 9/1996 | Gold et al. | |
| 5,971,325 A | 10/1999 | Gold et al. | |
| 6,076,024 A | 6/2000 | Thornberg et al. | |
| 6,145,428 A | 11/2000 | Gold et al. | |
| 6,189,836 B1 | * 2/2001 | Gold et al. | 244/191 |

* cited by examiner

Primary Examiner—Galen L. Barefoot
(74) Attorney, Agent, or Firm—Carlson, Gaskey & Olds (57) ABSTRACT

The flight control system includes a trim augmentation algorithm which advantageously provides two primary functions: direct augmentation of the rotor trim via on-axis stick input; and automatic cross-axis trim transfer as a function of the commanded yaw rate. In a first function of the present invention, when the aircraft is lagging the pilots commanded maneuver state the stick command is multiplied by a gain to direct the actual vehicle response toward said pilot commanded rate signal and improve the model following control laws. In a second function of the present invention, a cross-axis trim transfer function of the trim augmentation algorithm uses the commanded yaw rate to anticipate the trim change when the aircraft is rotating in winds. When a yaw maneuver is performed, the cross-axis trim transfer function automatically "stirs" the cyclic as the aircraft rotates about the yaw axis.

27 Claims, 4 Drawing Sheets

TRIM AUGMENTATION SYSTEM FOR A ROTARY WING AIRCRAFT

This invention was made with government funding under Contract No.: DAAJ09-91-C-A004 awarded by the Department of the Army. The government therefore has certain rights in this invention.

BACKGROUND OF THE INVENTION

The present invention relates to flight control systems for rotary wing aircraft, and more particularly to such flight control systems which provide effective yaw control.

In a helicopter, and in particular in an attack helicopter, the responsive of the helicopter about its yaw axis is crucial in combat situations. The aircraft must be capable of quickly moving about its yaw axis to bring its weapons to bear on a target. Therefore the flight control system has to be capable of responding with a tail rotor command which provides such responsiveness when a yaw input is received from the pilot.

One type of yaw maneuver requires the helicopter to travel forward along a first axis then rapidly yaw to point off the first axis while maintaining forward motion along the first axis. However, upon performance of such a maneuver, known flight control systems must be assisted by pilot input. The pilot input commonly requires the pilot to "stir" the cyclic during the yaw maneuver. Although effective, pilot workload is accordingly increased. A similar situation occurs when performing a yaw maneuver while hovering in a high wind condition.

Accordingly, it is desirable to provide a flight control system which automatically provides compensatory trim during yaw maneuvers to reduce pilot workload which thereby leads to a more capable attack helicopter.

SUMMARY OF THE INVENTION

The flight control system according to the present invention provides a trim augmentation algorithm which advantageously provides two primary functions: 1.) direct augmentation of the rotor trim via on-axis stick input; and 2.) automatic cross-axis trim transfer as a function of the commanded yaw rate.

In a first function of the present invention, direct trim augmentation is active in each axis (pitch and roll) when the pilot stick input is in the same direction as the rate error feedback signal. In other words, when the aircraft response is lagging the pilot's commanded maneuver state. When the direct augmentation logic in pitch and/or roll is true the stick command is multiplied by the gain, limited, and summed with the below described cross-axis trim transfer function at a summing junction to direct the actual vehicle response toward said pilot commanded rate signal and improve the performance of the model following control laws.

When a helicopter turns in winds, the total trim vector (sum of pitch and roll control vectors) remains nearly constant with respect to the direction of the wind. In other words, the trim vector stays fixed, while the aircraft rotates (yaws). In high winds there may be significant differences between the magnitudes of the pitch and roll trim positions (to cancel wind induced forces on the vehicle/rotor). These trim positions change significantly when the aircraft turns in the wind.

In a second function of the present invention, a cross-axis trim transfer function of the trim augmentation algorithm uses the commanded yaw rate to anticipate the trim change when the aircraft is rotating in winds. The commanded yaw rate times the scaled trim error yields the rate of change of the trim in the opposite axis (pitch to roll/roll to pitch). In other words, the relationship of the rotor trim vector to the wind is maintained independent of the rotation of the helicopter body therebelow. Thus, when a yaw maneuver is performed, the cross-axis trim transfer function provides for the automatic precession of the rotor control vector (trim state) relative to the aircraft body such that the pilot work load is reduced. In other words, the cross-axis trim transfer function automatically "stirs" the cyclic as the aircraft rotates about the yaw axis. The present invention therefore reduces the amount of compensatory pilot trim which must be input during yaw maneuvers which thereby leads to a more capable attack helicopter.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
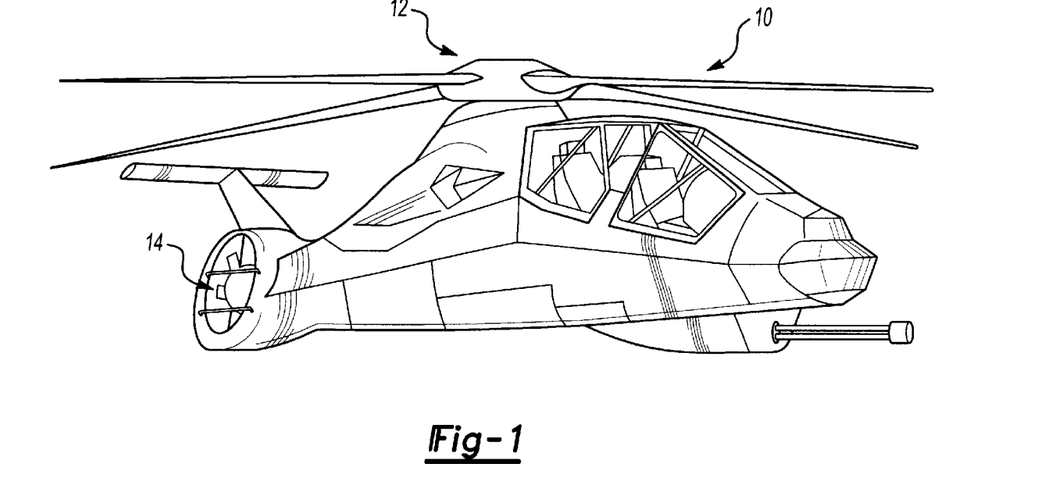
FIG. 1 is a general perspective view of an exemplary rotary wing aircraft embodiment for use with the present invention.

FIG. 1 illustrates a general perspective view of a helicopter embodiment 10 of a rotary wing aircraft for use with the present invention. The helicopter includes a main rotor assembly 12 and tail rotor assembly 14.

Figure 2:
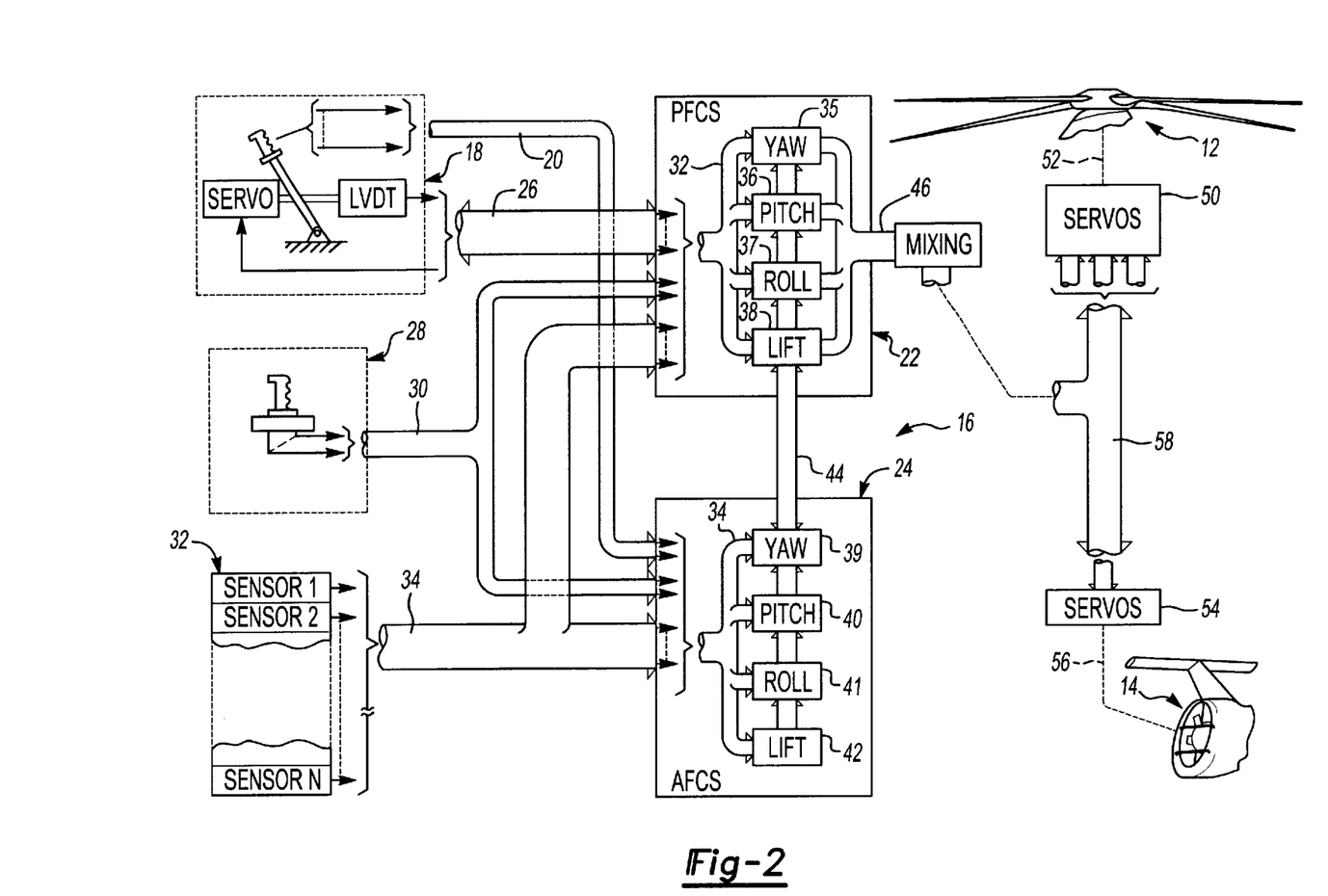
FIG. 2 is a block diagram of the improved model following flight control system of the present invention.

Referring now to FIG. 2, the helicopter flight control system 16 includes a model following control system which shapes the pilot's sidearm controller and displacement stick commands through an inverse vehicle model to produce the desired aircraft response. The system includes a Primary Flight Control System (PFCS) 22 and an Automatic Flight Control System (AFCS) 24. The PFCS and AFCS each receive the force output command signals of a displacement collective stick 18 on line 20, a cyclic stick 28 on lines 30, and the aircraft's sensed parameter signals from sensors 32, on lines 34. The pilot command signals on lines 20, 26, 30 and the sensed parameter signals on lines 34 are shown consolidated within trunk lines 32 and 34 in the PFCS and AFCS, respectively.

It should be understood that the reference herein to the term trunk lines is a figurative term for the collective signal pathways between the various elements of the system 16. As known to those skilled in the art, while the individual signal paths may be conductive wires which are bundled in trunks for purposes of utility and/or protection (the trunk lines may be shielded against both mechanical and electromagnetic interference), the trunks may equally well be digital signal busses, such as MIL-STD-1553, ARINC 429, 629, or RS422.

The stick 28 is preferably a sidearm controller four axis force stick in which the yaw axis command signal is generated by the pilot's twisting (left or right yaw) of the sidearm controller. Alternatively or additionally an aircraft with a conventional collective stick may also benefit from the present invention. Preferably, when no force is applied to the stick 28, the stick 28 is maintained in a detent or neutral position.

The PFCS and AFCS each contain separate control channel logic for controlling the yaw, pitch, roll and lift axes of the aircraft. The logic is included in the PFCS and AFCS control modules (schematically represented by blocks 35–38 for the PFCS and blocks 39–42 for the AFCS). The sensed parameter signals from sensors 32, on lines 34, provide the PFCS and AFCS with the aircraft's angular rate and attitude response to the rotor command signals. The PFCS logic provides rotor command signals and the AFCS logic provides conditioning and/or trimming of the PFCS four axis logic functions. The PFCS and AFCS logic modules interconnect through bus 44 to provide rotor command signals on output lines 46 to a mixing function 48 which commands on lines 58 displacement of mechanical servos 50 and linkages 52 to control the tip path plane of the main rotor 12. A mixed command signal is also provided on line 58 to the helicopter's tail rotor servos 54 which control the thrust of the tail rotor 14 through linkages 56.

Figure 3:
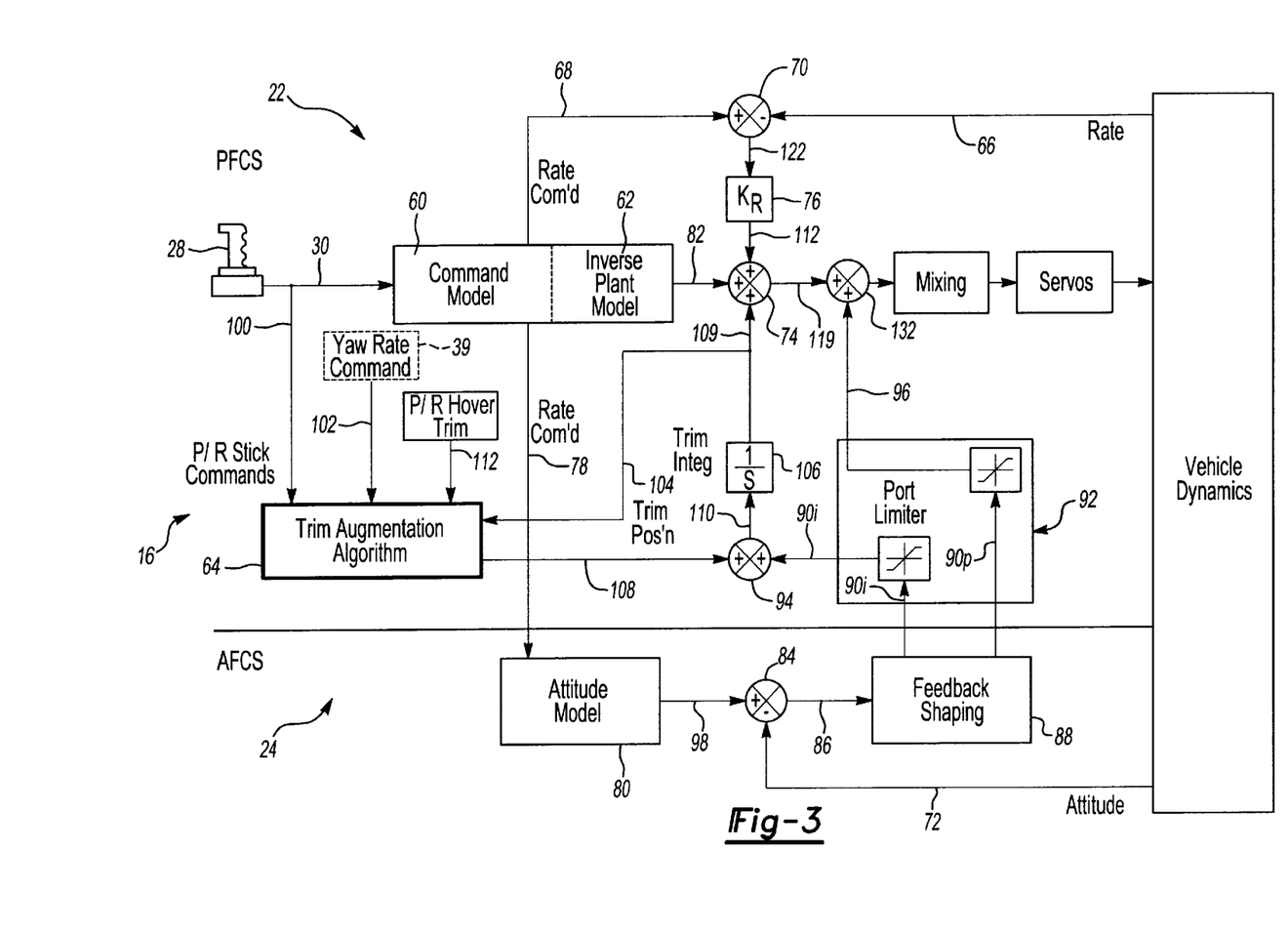
FIG. 3 is a block diagram of one embodiment of a system components illustrated in FIG. 2.

Referring to FIG. 3, a helicopter flight control system 16 of the present invention is preferably a model following control system. The system 16 shapes a pilot's displacement stick commands from a stick 28 through a command model 60, an inverse plant model 62 and a trim augmentation algorithm 64 to produce the desired aircraft response. The command model 60 and the inverse plant model 62 provide a feed forward path for the stick 28 while the trim augmentation algorithm 64 augments the introduction of trim and transfers the trim to the appropriate axis during radical yaw maneuvers.

The PFCS receives displacement command output signals from the stick 28. Displacement command output signals (pilot commanded rate of roll, pitch, yaw and lift) from the stick 28 are supplied to the command model 60 on line 30 where they are filtered and scaled to provide the pilot's commanded aircraft body-axis rate. The command model shapes the pilot command to provide a predefined control bandwidth. Selection of the command model is dependent on the dynamics of the aircraft and the response desired. The maximum commanded accelerations and rates are also preferably defined by the command model 60.

The command model 60 constitutes part of the model following control laws. As is known, the principal behind the command model is that for each stick input there is a corresponding repeatable aircraft response. The control system 16 preferably includes two feedback paths and one feedforward path. The first feedback path is based on actual aircraft rate. The actual aircraft rate is provided by sensors 32 (FIG. 2) on line 66. The actual aircraft rate from line 66 is compared to the pilot commanded rate on line 68 at summing junction 70. The rate error signal on the line 122 is provided to a main summing function 74 via a gain 76 and line 112.

The second feedback path is based on actual aircraft attitude. The actual aircraft attitude is provided by sensors 32 (FIG. 2) on line 72. The attitude model 80 integrates the pilot commanded rate on line 78 to produce the commanded aircraft attitude. Attitude feedback operates similar to rate error feedback to augment stability and provide better model following. The actual aircraft attitude is compared to the pilot commanded attitude at summing junction 84 in AFCS 24.

The feed forward path is provided by cascading the command model 60 and the inverse model 62 to provide the feedforward signal on a line 82 to the summing junction 74. This feed forward path is commonly referred to as a model following path, since the output of the command model 60 provides a desired rate response which is provided to the inverse model 62 resulting in a signal to drive the aircraft towards a response equal to the desired rate signal.

The inverse plant model 62 shapes the commanded acceleration and rate signals from the command model 60 using predefined stability and control derivatives to calculate the feed forward commands that will produce an approximation of the pilot desired rate response. The inverse plant model 62 is preferably a Z-model transform, which may be embodied as a first order lead filter with instantaneous voltage gain and time constant characteristics which vary with the magnitude of the sensed airspeed signal.

As will be further described, the commanded rate is compared to actual rate and the error is fed back through a gain to enhance the performance of the model following control laws and to reduce the effects of disturbances. The model following system of the PFCS 22 feeds back the difference between the pilot's commanded rate and the actual vehicle rate. So, if the aircraft is following the pilot's command, then the rate error at summing junction 70 would be zero and no signal would be fed back. This implementation augments the model following system in that if the aircraft's rate is lagging behind the pilot's command, then additional control will be added to speed up the response. Conversely if the aircraft responds too quickly, the feedback after gain 76 will tend to reduce the response. The rate error path serves to match the actual rate with the pilot's command. Disturbances to the aircraft (gusts, etc) that produce uncommanded rates will be rejected by the rate feedback paths. Since only the rate error is fed back, the model following control law does not fight the pilot stick inputs when the aircraft is tracking the pilot commanded rate.

With regard to the AFCS 24, the command model 60 communicates the commanded rate over line 78 to the attitude model 80. The attitude model 80 integrates the commanded rate to produce the commanded aircraft attitude on line 98. The commanded attitude on line 98 is combined with the aircraft's actual attitude from line 72 at AFCS summing junction 84 to provide an attitude error signal on line 86. The attitude error signal is then fed to the feedback shaping algorithm 88 of the AFCS.

Outputs from the feedback shaping algorithm 88 on lines 90I and 90P pass attitude error signal from line 86 to a port limiter algorithm 92. Limiter 92 provides a limited proportional trim path (line 96P to summing junction 132) and a limited trim rate path (line 96I to summing junction 94) to augment stability and provide steady state trim. The limiter 92, which receives nonlimited versions of the command signals from the AFCS feedback shaping algorithm 88, limits the command modifying signals if magnitude limits are exceeded. The attitude error feedback path includes the limited proportional path 96P and the limited integral/trim path 96I to minimize the error between the commanded attitude and the actual attitude.

Displacement pitch and roll command output signals from the stick 28 are supplied to the trim augmentation algorithm 64 of the present invention on lines 100P and 100R. The trim augmentation algorithm 64 receives a commanded yaw rate on line 102 from the PFCS yaw axis command model module 39. The trim augmentation algorithm 64 receives pitch and roll trim integrator positions on lines 109P and 109R from the trim integrators 106P and 106R. The trim integrators 106 integrate the summation of the trim augmentation algorithm 64 from lines 108 and the limited output 90I from limiter 92. The total trim rate signal on path 110 is thus integrated by trim integrator 106 to drive long term attitude errors to zero and to store the accumulated pitch and roll trim positions. The trim augmentation algorithm 64 further receives the pitch and roll nominal hover trims on line 112.

Preferably, the pitch and roll nominal hover positions on line 112 are a predetermined value related to the particular vehicle dynamics and are stored in the memory of the PFCS 22. It should be realized however, that although a predetermined stored or book-kept pitch and roll nominal hover position is provided in the disclosed embodiment, a calculated pitch and roll nominal hover position (related, for example, to a specific aircraft load configuration) will also benefit from the present invention.

The trim augmentation algorithm 64 outputs pitch and roll axis trim rate commands on lines 108. Pitch and roll axis trim rate commands on lines 108 are fed to the summing junction 94. The summing junction combines the pitch and roll axis trim rate commands from line 108 with the limited attitude error from the AFCS which is then fed to the trim integrator 106. The trim integrator 106 feeds back the trim positions to the trim augmentation algorithm 64 over line 104 and feeds forward the trim positions to the summing junction 74. The trim integrator 106 integrates the trim rate signal from the summing junction 94 over time, providing a signal indicative of desired aircraft trim on line 104.

Summing junction 74 combines the inverse plant model 62 output with the amplified rate error signal of line 112 with the command modifying signal from the trim integrator 106 on line 104 to produce the PFCS derived signal on line 114. The output of summing junction 74 is added to the AFCS derived proportional attitude error of line 90P at summing junction 132 to produce the total command signal to the mixing algorithm. The model following algorithm in each control axis is output from summing junction 132 on line 46 (FIG. 2) to command the main and tail rotor.

Figure 4:
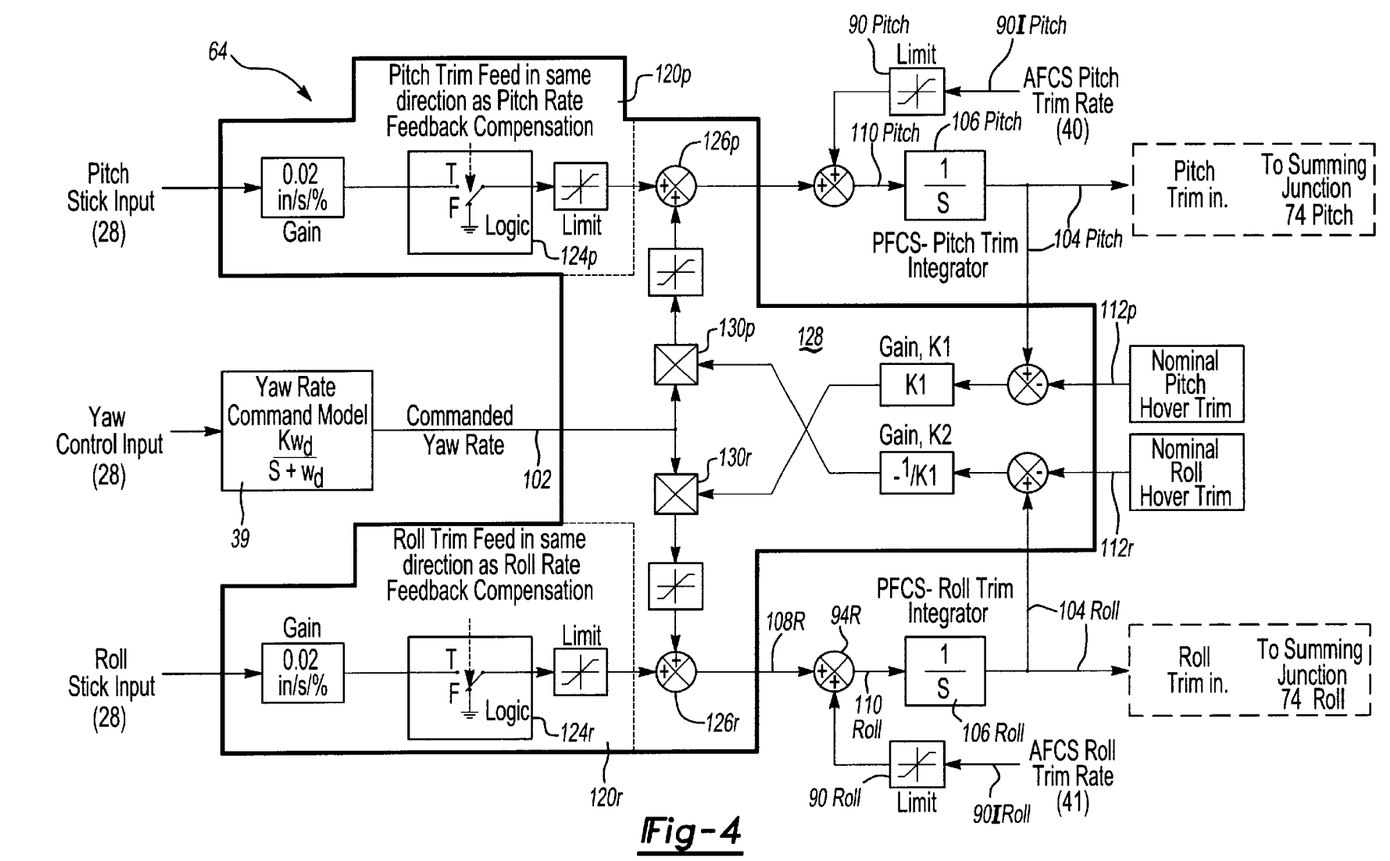
FIG. 4 is a block diagram of one embodiment of a trim augmentation system illustrated in FIG. 3.

Referring to FIG. 4, a schematic block diagram of one embodiment of the trim augmentation algorithm 64 according to the present invention is illustrated. The trim augmentation algorithm 64 advantageously provides two primary functions: 1.) direct augmentation of the rotor trim via on-axis stick input; and 2.) automatic cross-axis trim transfer as a function of the commanded yaw rate.

In a first function of the present invention, direct trim augmentation are active in each axis (pitch and roll) 120P, 120R when the pilot stick input is in the same direction as the rate error feedback signal (Line 122; FIG. 3). In other words, when the aircraft is lagging the pilot's commanded rate.

The pitch and roll stick input from the stick 28 (FIG. 2) is fed into the trim augmentation algorithm 64. The stick commands are independently multiplied by a gain. When the direct augmentation logic (illustrated schematically at 124P and 124R) in pitch and/or roll is true (the helicopter is lagging the pilot's commands) the stick command is multiplied by the gain, limited, and summed with the below described cross-axis trim transfer function at summing junction 126P and 126R. It should be understood that the gain is preferably related to the type of aircraft and desired responsiveness. Preferably, the stick inputs are provided in percents and the output of the gain is a trim rate in equivalent inches of the stick per second.

The trim augmentation algorithm 64 trim rate signal is summed with the limited AFCS trim rate signal in each axis (at summing junction 94; FIG. 3) and then integrated by the PFCS trim integrator. The trim rate signals are then output on line 46 (FIG. 2) to command the main and tail rotor as described above. The direct trim augmentation portion of the trim augmentation algorithm 64 in each axis preferably operates independently of each other and independently of the cross-axis trim transfer function 128 described below.

When a helicopter turns in winds, the total trim vector (sum of pitch and roll control vectors) remains nearly constant with respect to the direction of the wind. In other words, the trim vector stays fixed, while the aircraft rotates (yaws). In high winds there may be significant differences between the magnitudes of the pitch and roll trim positions (to cancel wind induced forces on the vehicle/rotor). These trim positions change significantly when the aircraft turns in the wind.

In a second function of the present invention, the cross-axis trim transfer function 128 of the trim augmentation algorithm 64 uses the commanded yaw rate to anticipate the trim change when the aircraft is rotating in winds. The commanded yaw rate times the scaled trim error yields the rate of change of the trim in the opposite axis (pitch to roll/roll to pitch). In other words, the rotor trim relationship to the wind is maintained independent of the rotation of the helicopter body therebelow. If, for example, no winds are present, the trim errors would be zero and no trim augmentation inputs would be applied.

As illustrated schematically in FIG. 4, the pitch trim signal 104P (FIG. 2) from the AFCS 24, preferably in inches, is compared to the nominal hover pitch trim 112P which is preferably a stored value as described above. The difference or pitch trim error is multiplied by a gain K1 to scale the resultant signal to be proportional to the ratio of total available pitch and roll control in degrees. Similarly, the roll trim signal 104R from the AFCS 24 is compared to the nominal hover roll trim 112R and the difference or roll trim error is multiplied by a gain K2.

In the present invention, the Gain K2 is the negative inverse of K1. K2 is the negative inverse of K1 to maintain a constant magnitude of the trim vector (in degrees) as it is precessed about the current trim position. Gain K1, which is preferably the ratio of total available degrees of pitch and roll control, scales the pitch trim error signal (in inches, for example) to be proportional to degrees of control. K2 is the ratio of roll to pitch degrees of control. In the present invention the negative sign is derived from the vector transformation, however, other relationships may benefit from the present invention depending upon the flight control system reference frame.

The amplified trim error signals are cross-fed into the opposite control axis at multipliers 130P, 130R. In other words, pitch to roll and roll to pitch. The amplified trim error signals are multiplied by the commanded yaw rate 39 (preferably in radians/second) from the PFCS 22 at the multipliers 130P, 130R. The cross-fed signals are magnitude limited and added to the direct trim augmentation at summing junctions 126P and 126R described above.

Figure 5:
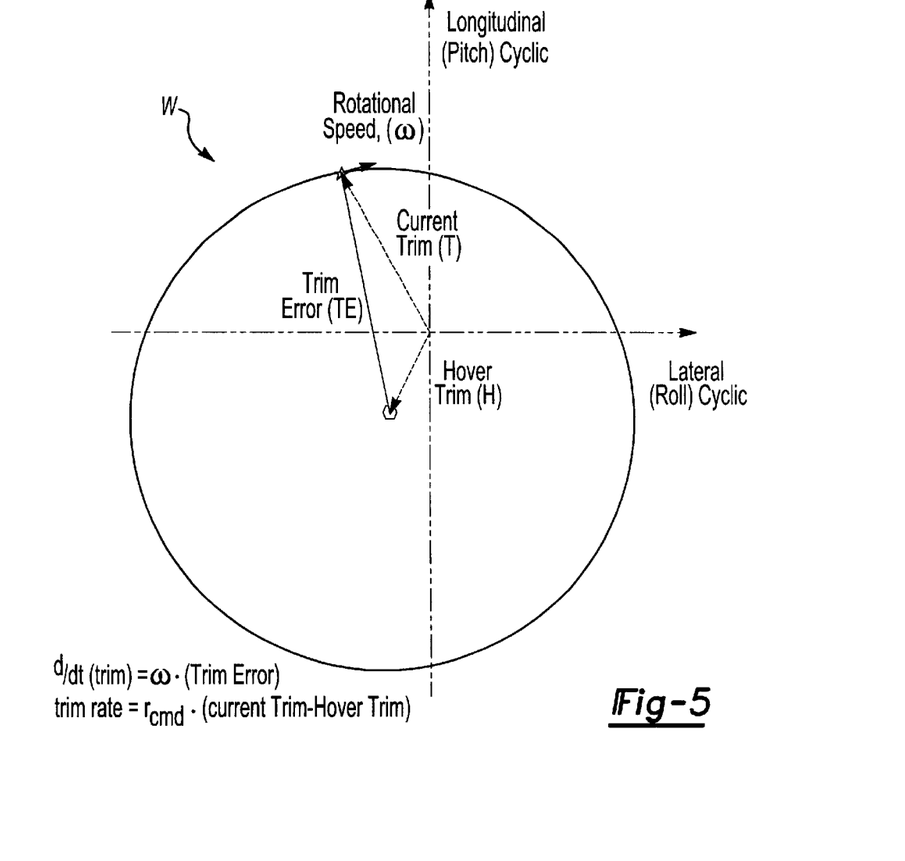
FIG. 5 is a schematic representation of the trim change performed by the trim augmentation system according to the present invention.

Referring to FIG. 5, the cross-axis trim transfer function is illustrated graphically. The cross feeds provide for the automatic precession of the rotor control vector (trim state) relative to the aircraft body as the aircraft rotates about the yaw axis as a function of the commanded yaw rate and is represent by the following formula:

$$d/dt(trim) = \omega*(trim\ error); or$$

$$trim\ rate = commanded\ yaw\ rate*(current\ trim - hover\ trim).$$

An origin 0 defines the mechanical center of the cyclic pitch and roll axis of the main rotor 19 (FIG. 1). Notably, due to vehicle properties, e.g. rotor downwash over the vehicle body and the like, the nominal hover trim H is not at the exact origin 0. As described above, the hover trim point is fixed and is preferably a predetermined stored valve. The hover trim is thus represented as a vector H which represents the trim error from the origin 0 to the nominal hover trim point.

The current trim point is located in FIG. 5 to represent a trim point due to, for example only, a wind W or for off-axis vehicle travel (the vehicle is traveling along an axis while the vehicle nose is pointed off that axis). A current trim T is thus defined as a vector from the origin 0 to the current trim point. The current trim is thus represented as a vector T which represents the trim error from the origin 0 to the current trim point.

The trim error TE is therefore the vector difference between the current trim T and nominal hover trim H. It should be understood that the trim augmentation algorithm 64 preferably computes the vector arithmetic necessary to determine the trim error TE. The present invention, however, is not limited to a microprocessor based control system. The system may be implemented in a non-microprocessor based electronic system (either digital or analog).

The vehicle rotational speed about the yaw axis or commanded yaw rate is represented as vector ω. Vector ω is graphically represented as tangential to the trim error TE. The magnitude of the vector ω is proportional to the yaw rate of the aircraft. The trim error TE is therefore precessed about the nominal hover trim H as a function of the commanded yaw rate ω. Notably, if there is no current trim error (current trim=nominal hover trim) no precession is required when the vehicle is commanded in the yaw axis.

It should be understood the scope of this invention is not limited by the specific gains, lag filters, summing functions and limiting functions presented herein. Rather, it is contemplated in the practice of the present invention that the specific control laws are going to change based upon the dynamics of the plant to be controlled (e.g., an attack helicopter versus a commercial helicopter), and the peculiarities associated with each plant. As an example, the PFCS rate command model maybe required in some applications to be a higher order than the first order lag disclosed hereinbefore. Similarly, the inverse model may be greater than first order. In addition it is not necessary that the flight control system be partitioned in a PFCS and an AFCS. Rather it is contemplated that the system may not be partitioned at all in some applications, whereas in other applications the system may be further partitioned into subsystems based on criteria such as reliability and maintainability.

Furthermore, while it is obvious it still is worth stating that the present invention is clearly not limited to a microprocessor based control system. The system may be implemented in a non-microprocessor based electronic system (either digital or analog).

The foregoing description is exemplary rather than defined by the limitations within.

Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A method of augmenting a flight control system for a rotary wing aircraft comprising the steps of:
    (1) identifying a direction of a rate error feedback signal for a first vehicle axis;
    (2) identifying a direction of a pilot commanded rate signal in said first vehicle axis;
    (3) determining whether said direction of said rate error feedback signal is equivalent to said direction of said pilot commanded rate signal; and
    (4) augmenting said pilot commanded rate signal by a gain in response to said step (3) to direct an actual vehicle response in said first vehicle axis toward said pilot commanded rate signal.

2. A method as recited in claim 1, wherein said gain is one (1) if said rate error feedback signal of said step 1 is zero.

3. A method as recited in claim 1, wherein said first vehicle axis is pitch.

4. A method as recited in claim 1, wherein said first vehicle axis is roll.

5. A method as recited in claim 1, furthering including magnitude limiting said pilot commanded rate signal after said step (4).

6. A method as recited in claim 1, wherein said gain is in inches per second per percent of said pilot commanded rate signal.

7. A method as recited in claim 1, furthering including:
    (5) summing said augmented pilot commanded rate signal from said step (4) with a limited Automatic Flight Control System trim rate signal.

8. A method as recited in claim 7, furthering including:
    (6) integrating said signal from said step (5) wit a Primary Flight Control System trim integrator.

9. A method as recited in claim 8, furthering including feeding said signal from said step (6) to a Primary Flight Control System trim integrator.

10. A method as recited in claim 1, wherein said Step (4) further comprises:
    augmenting said pilot commanded rate signal in response to a lag between the pilot commanded rate signal and the vehicle response.

11. A method as recited in claim 1, wherein said Step (4) further comprises:
    augmenting said pilot commanded rate signal by a gain in response to said direction of said rate error feedback signal being equivalent to said direction of said pilot commanded rate signal of said step (3).

12. A method as recited in claim 1, wherein said Step (4) further comprises:
    augmenting said pilot commanded rate signal in response to a lag between the pilot commanded rate signal and the vehicle response.

13. A method as recited in claim 1, wherein said Step (4) further comprises:
    trimming said vehicle in said first vehicle axis to direct an actual vehicle response in said first vehicle axis.

14. A method of augmenting a flight control system for a rotary wing aircraft comprising the steps of:
(1) identifying a trim error signal; and
(2) precessing said current trim error signal in response to a commanded yaw rate.

15. A method as recited in claim 14, wherein said step 1 furthering includes:
(1a) identifying a current trim signal; and
(1b) subtracting said current trim signal from a nominal hover trim signal to determine said trim error signal.

16. A method as recited in claim 15, wherein said nominal hover trim signal is a predetermined value.

17. A method as recited in claim 14, wherein said step 2 furthering includes:
(2a) multiplying said current trim error signal by said commanded yaw rate.

18. A method as recited in claim 14, wherein said step 2 furthering includes precessing said current trim error signal in a direction opposite said commanded yaw rate direction.

19. A method of augmenting a flight control system for a rotary wing aircraft comprising the steps of:
(1) identifying a current pitch trim signal;
(2) subtracting said current pitch trim signal from a nominal hover pitch trim signal to determine a pitch trim error signal;
(3) identifying a current roll trim signal;
(4) subtracting said current roll trim signal from a nominal hover roll trim signal to determine a roll trim error signal;
(5) multiplying said pitch trim error signal and said roll trim error signal by a commanded yaw rate;
(6) cross feeding said pitch trim error signal to a roll trim signal; and
(7) cross feeding said roll trim error signal to a pitch trim signal.

20. A method as recited in claim 19, furthering including multiplying said pitch trim, error signal by a first gain and said roll trim error signal by a second gain prior to said step 5.

21. A method as recited in claim 20, wherein said first gain scales said pitch trim error signal to be proportional to a ratio of total available pitch and roll control.

22. A method as recited in claim 21, wherein said second gain scales said roll trim error signal to be proportional to a ratio of total available pitch and roll control.

23. A method as recited in claim 22, wherein said second gain is the negative inverse of said first gain.

24. A method as recited in claim 19, furthering including:
(8) summing said roll trim signal from said step (6) with a limited Automatic Flight Control System roll trim rate signal; and
(9) summing said pitch trim signal from said stop (7) with a limited Automatic Flight Control System pitch trim rate signal.

25. A method as recited in claim 24, furthering including:
(10) integrating said signal from said step (8) with a Primary Flight Control System roll trim integrator; and
(11) integrating said signal from said step (9) with a Primary Flight Control System pitch trim integrator.

26. A method as recited in claim 25, furthering including feeding said signals from said steps (10) and (11) to a rotary wing aircraft control surface.

27. A method as recited in claim 19, furthering including:
(8) summing said roll trim signal from said step (6) with an augmented pilot commanded roll rate signal; and
(9) summing said pitch trim signal from said step (7) with an augmented pilot commanded pitch rate signal.

* * * * *

UNITED STATES PATENT AND TRADEMARK OFFICE
CERTIFICATE OF CORRECTION

PATENT NO.   : 6,648,269 B2   Page 1 of 1
DATED        : November 18, 2003
INVENTOR(S)  : Gold et al.

It is certified that error appears in the above-identified patent and that said Letters Patent is hereby corrected as shown below:

<u>Column 10,</u>
Line 17, please change "stop" to -- step --

Signed and Sealed this

Third Day of February, 2004

JON W. DUDAS
*Acting Director of the United States Patent and Trademark Office*